United States Patent Office 2,767,081
Patented Oct. 16, 1956

2,767,081

USE OF NUCLEATING AGENTS IN THE REDUCTION OF SALTS TO METAL

Vladimir Nicolaus Mackiw, Fort Saskatchewan, Alberta, Canada, Tuhin Kumar Roy, Calcutta, India, Wei Cheng Lin, Ottawa, Ontario, and Vasyl Kunda, Fort Saskatchewan, Alberta, Canada, assignors to Chemical Construction Corporation, New York, N. Y., a corporation of Delaware No Drawing. Application December 23, 1953, Serial No. 400,118

9 Claims. (Cl. 75—108)

This invention is concerned with the precipitation of non-ferrous metals from aqueous solutions of dissolved metal salts by the action of reducing gases at elevated temperature and pressure. More particularly, it relates to an improvement in such processes to obtain copper, cobalt and nickel as metal powder of more desirable physical and chemical characteristics such as size, density or purity. Still more particularly, it deals with the use of nucleation promoters, which at reduction conditions effect activation of the reducing gas to initiate precipitation from such solution of metal powder having characteristics which render it suitable for use as nuclei in treating additional portions of solution.

In recent years, there has been a continually increasing commercial interest in the hydrometallurgical recovery of non-ferrous metals, particularly nickel and cobalt, from various ores, ore concentrates, plant by-products and second metals. Various proposals have been made, not only in leaching methods, but also in methods of separately or conjointly precipitating metal powders from solution and in overall processes combining these features. It is with the reduction or precipitation of metals from solutions with which this present invention is concerned.

It should be understood that the treatment of solutions at elevated temperatures and pressures with a suitable reducing gas to reduce or precipitate metal therefrom is usually referred to as reduction. However, in accordance with this invention, there are certain stages in this reduction treatment at which different results, for example different product characteristics such as size or density, are sought and obtained. These stages may not be all conducted under similar operating conditions.

In order to minimize the possibility of confusion, it is desirable to define certain terms which will be used in the subsequent discussion. Throughout the specification and claims, therefore, the following terms will have the following meanings:

Nuclei: fine metal particles precipitated and/or grown from solution in the substantial absence of added metal powder.

Seed: fine metal particles, including preformed nuclei, usually but not necessarily of the metal to be recovered, which are present in the slurry which is being treated and which provide surfaces on which precipitated metal may deposit, even under conditions at which nuclei do not form readily.

Reduction: the generic designation of the overall operation in which elemental metal is obtained from a metal salt.

Nucleation: the initiation of reduction to and formation of nuclei.

Precipitation: that stage in reduction when metal is depositing on nuclei or on seed under conditions at which nuclei can form, usually resulting in particles of relatively low density.

Densification: reduction in the presence of seed powder under conditions at which nucleation is unlikely, whereby precipitated metal particles are obtained which have a greater apparent density than can be obtained under nucleation conditions.

In the past, it has been demonstrated that copper, nickel and cobalt can be precipitated, although with varying indifferent degrees of success, from both acidic and ammoniacal solutions. Such processes have not achieved commercial success because of failure in several respects. The degree to which reduction was obtained or the purity of the product, or both, were usually unsatisfactory. Either reduction could not be initiated or it could not be maintained. Even more troublesome, precipitation when obtained was seldom as useful discrete powder but more often as useless foil or plating on the vessel.

More recently it has been shown that reduction can be started and maintained by proper control of factors not previously recognized. In particular, it was found that deposition of the product metal as a useful, discrete powder during reduction could be obtained by careful control of the solutes content, both in initiating and in maintaining effective reduction. However, this degree of control is both troublesome and costly.

It has also been shown that the use of seed metal powder in such processes minimizes the necessity for the above described careful control and insures prompt initiation of densification reduction. Densification, however, provides little if any additional metal powder having suitable characteristics for use as seed powder in densification of additional portions of solutions. Accordingly, in order to obtain sufficient seed powder for further use, it has usually been necessary to mechanically size-reduce powder obtained by densification. Not only is this difficult because of the fine size desired, but it is an extremely costly procedure. Additionally, it is not wholly satisfactory because of the large recycle of metal powder necessitated.

More recently there has been suggsted a process providing nuclei suitable for use as seed metal powder by gas reduction and then using such nuclei in densification. In general, the process actually takes advantage of a difficulty which in the past has been quite troublesome. Solution conditions which are most suitable for initiating reduction, i. e., nucleation, to elemental metal are seldom, if ever, those most desirable for maintaining precipitation to the desired degree. One set of optimum conditions is required to obtain a self-nucleating solution. Under such conditions, precipitation may not be readily completed and the powder usually does not have the desired physical characteristics. Quite different conditions may be optimal for densification, i. e., completion of reduction and/or production of powder of optimum properties. Past attempts at compromise conditions were usually unsatisfactory, particularly for nickel and cobalt.

According to the above-noted suggestion, a process has been proposed in which seed powder of the proper type is precipitated from a solution which is adjusted for optimum self-nucleation, in other words a solution in which the reduction is most easily started. Seed metal so produced is then used to initiate densification in a solution which is adjusted for optimum conditions for desired grain growth.

While this process successfully avoids the disadvantages of mechanical reduction of metal powder to produce seed and provides nuclei suitable for use as seed for densification, nevertheless it, too, is subject to certain drawbacks. One major drawback is the extremely rigid control requirements. Nucleation occurs most satisfactorily under quite restrictive hydrogen ion content conditions, usually acidic. Similarly, densification usually best occurs under conditions in which the metal content is dissolved as a metal-ammine complex and the hydrogen ion content is much lower. Accordingly, extensive pH adjustments are usually required, particularly when the liquor to be nucleated has not been previously brought incidentally to a proper acid content suitable for nucleation. A further drawback is that even though excellent seed-powder is produced, the time required to obtain it is lengthy. The overall treatment time for complete precipitation from liquor under nucleating conditions may be quite long.

There remains, therefore, in the field of hydrometallurgy a demand which has not as yet been wholly satisfied. This demand is for a successful method for rapidly nucleating and then densifying the nuclei by precipitation of metal powder by gas reduction from solutions having widely diversified solutes contents. Particularly is such a method needed for treatment of ammoniacal metal-bearing solutions. It is a principal object of this invention, therefore, to fulfill this demand. It is a particular object of this invention to provide a method of rapidly inducing reduction and the precipitation of metal nuclei suitable for use as seed in densification reduction of the remainder of the nucleation solution and/or other portions of solution.

In general, this object has been surprisingly met by incorporating in the solution any of a group of materials which act in some manner to initiate precipitation of metal as finely divided metal particles suitable as nuclei on which further deposition of metal may occur under conditions for optimum grain growth.

Exactly why reduction of solutions is influenced in this startling manner in the presence of such materials is not understood at this point. Nor is it desired to limit this surprising discovery by any particular theory of operation. It appears, however, that these materials have, in one form or another, a catalytic effect which enhances the action of the reducing gas, usually hydrogen. It may be that these materials, themselves, under reducing conditions, are capable of activating hydrogen. Or perhaps these materials under reduction conditions form precipitates which activate the reducing gas sufficiently to initiate reduction. At any rate, whatever the reason, the presence of any of such materials is highly beneficial for the rapid initiation of precipitation of metal powder having nuclei characteristics.

The materials which have been found useful in accordance with the present invention vary quite widely in their chemical characteristics. Except for the fact that they are all capable of producing the desired result apparently by activating the reducing gas in one way or another, it is rather difficult to classify them by common physical and/or chemical features.

For example, among those materials which, under reduction conditions, promote nucleation and/or initiate reduction in this manner and precipitate fine metal powder, are carbonate compounds. One way in which this effect may be employed to advantage is by adjusting the carbonate content of the solution being treated. For instance, in a cobalt salt solution, carbonation appears to form cobalt carbonate. On heating the solution to reduction temperature, cobalt carbonate may decompose in part to cobaltous oxide. The resultant catalytic effect activates the reducing gas so as to initiate precipitation of cobalt powder. Carbonates of the alkali metals and alkaline-earth metals, particularly calcium, may also be readily employed to advantage.

Another excellent example is found in that the presence of hydroxide ions also readily induces reduction. Various hydroxide compounds, particularly the alkali metal hydroxides, may be advantageously employed. An aqueous solution of cobalt sulfate, for example, is normally somewhat acid and it is difficult to initiate and maintain reduction to metal powder. Such a solution nucleates readily when made alkaline with potassium hydroxide, for instance. More hydroxyl ions than necessary to insure definite alkalinity are not necessary but unless the excess is very large appear to do no harm.

Precipitation of fine metal powder is also initiated by the presence of sulfide ions. These may be provided by the addition of any of various soluble sulfide compounds. Ammonium sulfide, for instance, is a particularly well adapted material to use as a source of sulfide ions. The alkali or alkaline earth metal sulfides may also be conveniently employed. In addition, thiosulfates, polythionates and the like are also effective.

The desired catalytic effect is also obtained by the presence in the reduction solution of certain elements. A small amount of carbon, activated charcoal, for instance, has been found highly effective. A suspension of diflocculated graphite in water has also been very successfully employed to initiate reduction and formation of fine metal powder. The presence of elemental phosphorous has likewise been found highly beneficial.

It is apparent, therefore, that there are many materials which, when added to the solution, either produce something which has, or themselves have the surprising effect of being able to activate hydrogen at reduction temperatures sufficiently to initiate reduction. These, of course, do not all have the same power of activation. Some are superior to others. The amount employed to induce reduction in each case is governed accordingly. It has been found, however, that, in general, a catalytically effective nucleating amount is at least about 0.01 g./l. In some cases, the amount necessary to induce nucleation may be substantially greater than this. It must not, however, be so great as to contaminate a final metal product beyond market specifications. After nucleation is conducted to the desired extent, nuclei may be collected and/or combined with additional solution for densification reduction. The size of nuclei employed for densification reduction may vary. Excellent results are obtained, however, when nucleation reduction is continued sufficiently long to provide nuclei for densification reduction having an average particle diameter of at least about 1.0 micron.

In general, the specific nature or origin of the solution to be nucleated may be considered as independent of the present invention. From whatever source, an aqueous solution of soluble salts of the non-ferrous metals is obtained. Usually this solution will have been obtained by some known per se leaching operation of a suitable ore, ore concentrate, metallurgical plant by-product or secondary metals.

Actually the metals which may be treated according to the present invention may be any non-ferrous metal having an oxidation-reduction potential between those of cadmium and silver, inclusive, and which is capable of forming with ammonia a complex ion that is readily reduced to elemental metal with a suitable reducing gas. Practically, this contemplates the metals silver, mercury, copper, nickel, cobalt and cadmium. Commonly the metals principally encountered will be copper, cobalt and nickel. Copper, however, is more easily reduced under a wider range of conditions. Consequently, while the use of a catalytic nucleating promoter is desirable with copper its urgency is not so great. It is with the recovery of cobalt and nickel, therefore, that the present invention is particularly concerned.

The non-metallic ion which goes to make up the metal salt to be reduced may be of any inorganic acid or strong organic acid provided it forms a soluble salt of the metal and is not reduced under precipitation conditions. Generally these will be limited to the chlorides, acetates, sulfates, and carbonates. The nitrates are good under basic conditions but are not useful under acidic reduction conditions. In actual practice, only the sulfates and carbonates are commonly encountered. The invention has its greatest applicability in the treatment of copper, nickel and cobalt sulfates whether originally obtained by dissolving salts or by acid or ammoniacal leaching. Particularly when using ammoniacal leaching as a method of preparing the solution, it will be found that the solutions will contain varying amounts of ammonium sulfate or ammonium carbonate and it is contemplated that one or both of these materials may be and usually are present.

Depending upon solution conditions, the dissolved metal salt may be in any one of several forms. For example, in pregnant leach liquors the ammonium salt content may be quite high and the metal salt may be a simple salt such as the metal sulfate $MeSO_4$ or a complex metal "ammine" salt such as a metal ammine sulfate $Me(NH_3)_xSO_4$. The former is usually that found to some extent in solution having an acidity greater than about pH 4–5. The latter may be found to a certain degree in solutions of varying hydrogen ion concentrations but appears in appreciable amounts at a hydrogen ion concentration less than about pH 5.5 in the case of cobalt, or about pH 6.5 in the case of copper and nickel. The ammine salt will be found to comprise substantially the entire dissolved non-ferrous metal content when the acidity is less than a pH of about 7.5. Both forms may be found in the intermediate ranges. Between pH values of about 5–5.5 for cobalt, and 5–6.5 for copper and nickel, metal hydroxides and/or basic salts may be found when the ammonium sulfate content is low. In some cases, in solutions of near netural or slightly acid characteristics, the dissolved metal may form a double salt such as a metal sulfate-ammonium sulfate double salt probably of the structure $MeSO_4 \cdot (NH_4)_2SO_4 \cdot XH_2O$, as the solution is cooled. This will not be commonly encountered in leach liquors because, although the double salt is rather soluble as compared with the other forms, in the presence of a sufficient amount of ammonium salt it is practically insoluble. In solutions containing considerable excess free acid, particularly in the case of sulfates, some form of acid complex with the free acid appears to form. However, these sulfate complexes or their analogues are reducible under the conditions of the present invention.

A typical feed solution may be considered as an aqueous sulfuric acid or aqueous ammoniacal solution containing dissolved salts, illustratively sulfates, of nickel, cobalt and ammonia. Such a sulfate solution, if saturated and ammoniacal, may contain as high as 150 grams per liter of dissolved metal at ambient conditions. Acidic solutions usually run lower, about 100 grams per liter. In some cases these figures may be slightly higher, in others somewhat lower. A solution containing less than about 5–10 grams per liter is ordinarily uneconomical to treat commercially without first using some means of concentrating the solutes content. A typical solution found in practice will usually contain from about 30–70 grams per liter of combined nickel plus cobalt. For commonly encountered copper sulfate and carbonate solutions, the copper content will be less than about 100 g./l. and 135 g./l., respectively.

Nucleation, precipitation and densification are carried out using a suitable, sulfur-free reducing gas such as carbon monoxide, hydrogen or a combination of them. In general, hydrogen, when it can be obtained, is preferable, especially for densification. Both nucleation and densification are carried out at a temperature above about 200° F., usually between about 300°–550° F. Higher temperatures may be used, if so desired. At least sufficient total pressure including the reducing gas over pressure, should be used to prevent boiling of the solution at the reaction temperature. Pressures greatly in excess of this equivalent pressure are not necessary and do no particular good. They should be avoided as placing an unnecessary restriction on the apparatus requirements. For the same reason unnecessarily high temperatures should be avoided as requiring excessive pressures. It is a further advantage of this invention moreover that nucleation and precipitation may be carried out at low temperatures.

The following examples will further demonstrate the invention. These examples are meant only to be illustrative and are not by way of limitation.

Examples 1–4 comprise runs in which no catalytic nucleating promoter was present during reduction. By comparison with the remaining examples, the advantages obtained by practising the process of this invention are clearly demonstrated.

*Example 1*

1500 parts of solution containing 50 gm./l. of cobalt as cobalt sulfate, 2.5 gm./l. of nickel as nickel sulfate, an $NH_3$:Co ratio of 2:1, and no ammonium sulfate was reduced with hydrogen at a temperature of 400° F. and a total pressure of 800 p. s. i. g. for 2 hours. Reduction was incomplete and substantially 100% of the metal precipitated occurred as tightly held incrustation on the walls of the reaction vessel.

*Example 2*

Example 1 was repeated except that the $NH_3$:Co ratio was 3:1 and the reduction period was increased to 2.5 hours. Although extent of reduction was somewhat increased, all metal precipitate still appeared as a tightly held wall incrustation with complete absence of metal powder of any description.

*Example 3*

Example 1 was repeated again, except that the solution was adjusted to an $(NH_4)_2SO_4$:Co ratio of 0.66:1 and reduction conducted at 525° F. and 1000 p. s. i. g. for 1 hour. Even under these stringent conditions reduction was incomplete. Moreover, any metal which occurred as powder was not suitable for use as seed in subsequent reductions.

*Example 4*

1500 parts of a solution containing 50 gm./l. of cobalt as cobalt chloride, an $NH_3$:Co ratio of 3:1 and an $(NH_4)_2SO_4$:Co ratio of 0.66:1 was reduced with hydrogen at 400° F. and 800 p. s. i. g. total pressure. After 2 hours there was no appreciable reduction in any form.

*Example 5*

2000 parts of a solution containing 50.5 g./l. cobalt as cobalt sulfate, 2.44 g./l. nickel sulfate, an $NH_3$/Co mol ratio of 3.9, an $(NH_4)_2SO_4$/Co mol ratio of 0.64 and an $(NH_4)_2CO_3$/Co mol ratio of 0.5 was reduced with hydrogen at 450° F. and 900 p. s. i. g. total pressure for 2½ hours. Reduction was 98.5% complete and precipitated metal recovered as a very fine powder suitable as seed powder.

*Example 6*

A sample of a solution containing 85.8 g./l. of copper, 135 g./l. $NH_3$, 100 g./l. $CO_2$, and 10 g./l. $CaCO_3$ as a catalytic nucleation promoter was reduced with hydrogen at 350° F. and 900 p. s. i. g. total pressure for 75 minutes. A fine copper powder having an apparent density of 1.24 was obtained. This product powder was highly suited for use as seed in densification reductions.

*Example 7*

The procedure of Example 6 was repeated except that 10 g./l. of activated charcoal were substituted for calcium carbonate as the nucleation promoter. Again, substantially the entire precipitated metal was recovered as a fine powder. This powder had an apparent density of 1.15.

*Example 8*

A sample of a solution containing 50 g./l. cobalt as cobalt sulfate, 2.5 g./l. nickel as nickel sulfate, an $NH_3$:Co ratio of 3:1, an $(NH_4)_2SO_4$:Co mol ratio of 0.5:1 and 0.013 g./l. of difloculated graphite as a nucleation promoter was reduced with hydrogen at 375° F. and 800 p. s. i. g for 75 minutes Reduction was substantially complete and precipitated metal recovered as a discrete powder.

*Example 9*

2000 parts of a solution containing 50 g./l. cobalt as cobalt sulfate, 2.5 g./l. nickel as nickel sulfate, an NH$_3$:Co mol ratio of 3.0, an (NH$_4$)$_2$SO$_4$:Co mol ratio of 0.67, and an S$^=$ ion concentration of 0.022 g./l. added as ammonium sulfide as nucleation promoter was reduced with hydrogen at 450° F. and 900 p. s. i. g. total pressure. Reduction was 96.3% complete after 2 hours. Precipitated product had an apparent density of 0.516.

*Example 10*

1500 parts of a solution containing 25 g./l. nickel as nickel chloride, an NH$_3$:Ni mol ratio of 3:1, an NH$_4$Cl:Ni ratio of 0.66 and 0.04 g./l. S$^=$ added as ammonium polysulfide was reduced with hydrogen at 400° F. and 800 p. s. i. g. total pressure. Reduction was complete in 30 minutes.

*Example 11*

2000 parts of a solution containing 50 g./l. of cobalt as cobalt sulfate, 2.7 g./l. nickel as nickel sulfate, an (NH$_4$)$_2$SO$_4$/Co mol ratio of 0.65 and a KOH/Co mol ratio of 2:1 was reduced with hydrogen at 400° F. and 800 p. s. i. g. total pressure. Reduction was 96.4% complete.

We claim:

1. In recovering elemental metal selected from the group consisting of copper, nickel, and cobalt as discrete powder from an aqueous solution containing at least one dissolved salt of at least one such metal by treating said solution with a reducing gas at a superatmospheric pressure and an elevated temperature, the improvement in combination therewith of rapidly inducing reduction to and formation of nuclei which comprises: initiating treatment in the presence of a finite amount of a nongaseous, nonmetallic nucleation promoter which is not a reducing agent but which under the treatment conditions effects activation of the reducing gas whereby nuclei are formed.

2. A process according to claim 1 in which metal nuclei are collected and used as seed in densification reduction of an aqueous solution containing at least one salt of at least one such metal whereby metal precipitated during densification is deposited on the seed.

3. A process according to claim 1 in which nuclei are combined with additional solution adjusted for formation of nuclei and nucleation reduction continued until nuclei of at least 1.0 micron average particle diameter are obtained.

4. A process according to claim 1 in which there is present at least 0.01 gram of nucleation promoter per liter of solution being treated.

5. A process according to claim 1 in which the promoter is an alkali metal carbonate.

6. A process according to claim 1 in which the promoter is an alkali metal sulfide.

7. A process according to claim 1 in which the promoter is carbon.

8. A process according to claim 1 in which the promoter is calcium carbonate.

9. A process according to claim 1 in which the promoter is an alkali metal hydroxide.

References Cited in the file of this patent

UNITED STATES PATENTS

| | | |
|---|---|---|
| 1,426,517 | Sulzberger | Aug. 22, 1922 |
| 1,783,662 | Marx et al. | Dec. 2, 1930 |